Oct. 10, 1944.　　W. F. BUTLER　　2,359,745
CONVEYER
Filed May 15, 1941
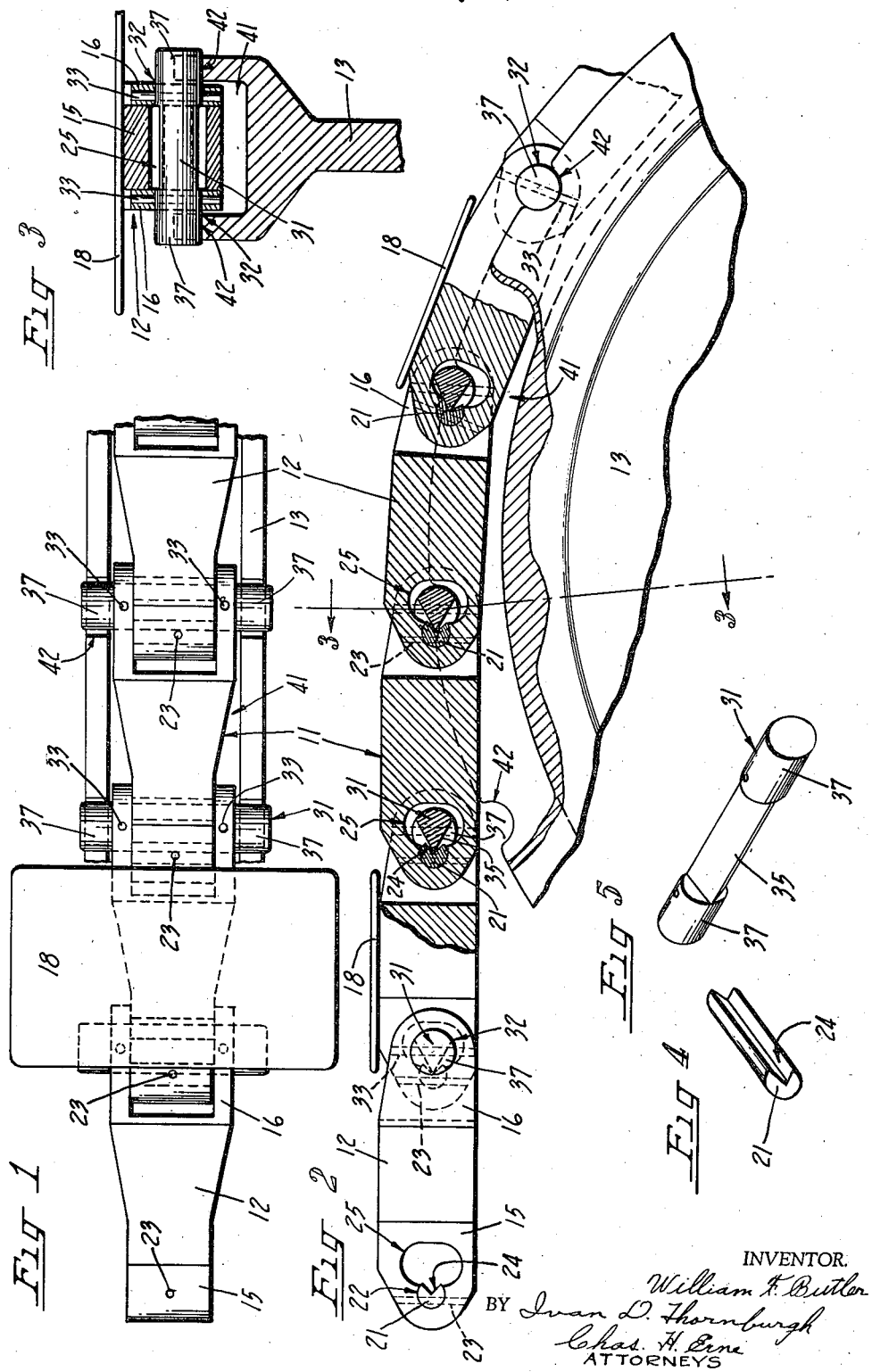
INVENTOR.
William F. Butler
BY Ivan D. Thornburgh
Chas. H. Erne
ATTORNEYS Patented Oct. 10, 1944

2,359,745

UNITED STATES PATENT OFFICE 2,359,745

CONVEYER

William F. Butler, Hillside, N. J., assignor to American Can Company, New York, N. Y., a corporation of New Jersey Application May 15, 1941, Serial No. 393,628

2 Claims. (Cl. 74—255)

The present invention relates to conveyers of the link chain character for high temperature ovens and the like and has particular reference to an oilless link construction of chains.

An object of the invention is the provision of a link chain conveyer wherein the links of the chain are connected with cooperating knife edge and socket pivot pins which constitute an oilless pivot connection and which will operate indefinitely without the use of lubricants so that the conveyor as a unit may be subjected to high temperature without fear of failure due to lack of lubrication.

Numerous other objects and advantages of the invention will be apparent as it is better understood from the following description, which, taken in connection with the accompanying drawing, discloses a preferred embodiment thereof.

Referring to the drawing:

Figure 1 is a top plan view of a portion of a conveyer chain embodying the instant invention and showing a portion of a sprocket therefor, with parts broken away;

Fig. 2 is a side elevation of the conveyer chain and sprocket shown in Fig. 1, with parts broken away and other parts shown in section;

Fig. 3 is a transverse section taken substantially along the line 3—3 in Fig. 2, with parts broken away; and Figs. 4 and 5 are perspective views of pivot pins used in the conveyer chain.

As a preferred embodiment of the invention the drawing illustrates a portion of an endless chain conveyer 11 (Figs. 1 and 2) composed of pivotally connected links 12 which operate over a sprocket 13. The links preferably are formed with a straight shank end 15 and a bifurcated end 16 into which the shank end of an adjacent link fits. Some of these links may be formed with platforms 18 for carrying articles, if desired.

The shank end 15 of each link 12 carries a recessed pivot pin 21 (Figs. 2 and 4) which fits tightly into a transverse hole 22 in the link. The pivot pin is held against rotation by a holding pin 23 which extends through the link and through the pivot pin. The pivot pin along one side is formed with a V-notch 24. The pin is located in the link in such a manner that the side which contains the notch 24 extends into an elongated opening 25 formed in the link adjacent to and communicating with the hole 22.

The bifurcated end 16 of each link 12 carries a rocker or knife edge pivot pin 31 (Figs. 2, 3 and 5) which fits tightly into transversely aligned holes 32 in the link. The rocker pin 31 is secured against rotation by holding pins 33 which extend through the link and through the rocker pins. The rocker pins extend through the elongated openings 25 in the shank ends 15 of the links when the chain is assembled and the rocker pin is thus adjacent and parallel with the pivot pin 21 in the shank end of the adjacent link in the chain.

That portion of each rocker pin 31 which is disposed within the opening 25 of the shank of the adjacent link 12, is formed with a sharp V-shape knife edge 35. This knife edge engages into the V-shaped notch 24 in the adjacent pivot pin 21 and thus provides a knife edge connection between the pivot pins and the links which carry them. The V-shaped notch 24 in the pivot pin 21 is considerably wider than the knife edge on the connecting rocker pin 31 so that a relative pivotal or rocking movement between the pins may be obtained.

The ends of the rocker pins 31 project beyond the outside surfaces of the bifurcated ends 16 of the links 12 and thus constitute trunnions or chain propelling lugs 37 which are equally spaced along the length of the chain assembled from such links. The chain operates in an annular groove 41 formed in the outer periphery of the sprocket 13 and the trunnions engage in spaced notches 42 formed in the sprocket adjacent the groove.

Hence with such a construction of chain links, the knife edge rocker pins 31 pull against and rock in the V-shaped notches 24 of the pivot pins 21 and the engaging surfaces are so small and the pivot pins preferably are of hardened material so that very little wear takes place. This eliminates the need for lubrication and hence provides a chain which is ideal for oven and the like installations where high temperatures usually render lubricants useless.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sprocket chain conveyer comprising a plurality of separate links, a transverse pivot pin rigidly secured in one end of each link and having a tapered knife edge formed thereon, and a cooperating transverse pivot pin rigidly secured in the opposite end of each link and having a V-notch therein for receiving the knife edge of the immediately adjacent link, said opposite link end being cut out in a recess extending from the V-notch in said pivot pin on one side and surrounding said knife edged pivot pin with the opposite wall of the recess spaced from the back of said knife edged pin opposite the knife edge thereof, thereby providing clearance for rocking movement of said knife edge on one link within and relative to the V-notch of the immediately adjacent secured link while preserving a non-shifting straight line contact between said links when passing over a conveyor sprocket, whereby to provide a pivotal connection between the links which will operate indefinitely without lubrication.

2. A sprocket chain conveyer comprising a plurality of separate links, a transverse pivot pin rigidly secured in one end of each link and having a tapered knife edge formed thereon, and a cooperating transverse pivot pin rigidly secured in the opposite end of each link and having a V-notch therein for receiving the knife edge of the immediately adjacent link, said opposite link end being cut out in a recess extending from the V-notch in said pivot pin on one side and surrounding said knife edged pivot pin with the opposite wall of the recess spaced from the back of said knife edged pin opposite the knife edge thereof, thereby providing clearance for rocking movement of said knife edge on one link within and relative to the V-notch of the immediately adjacent secured link while preserving a non-shifting straight line contact between said links when passing over a conveyer sprocket, the opposite ends of one of said pivot pins in each link being extended beyond the overall length of the other of said pivot pins to constitute chain propelling lugs for engagement between the teeth of said sprocket, whereby to provide a pivotal connection between the links which will operate indefinitely without lubrication.

WILLIAM F. BUTLER.